Aug. 19, 1930.  P. E. EDELMAN  1,773,665
POLARIZED ELECTRICAL COUPLE
Filed April 12, 1928
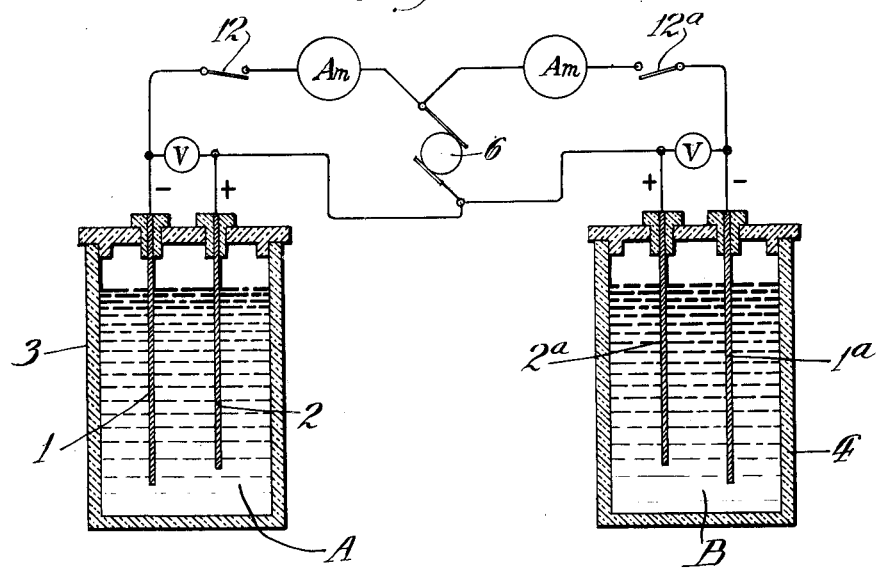
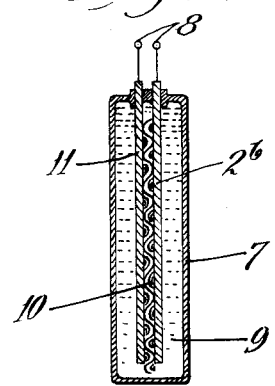
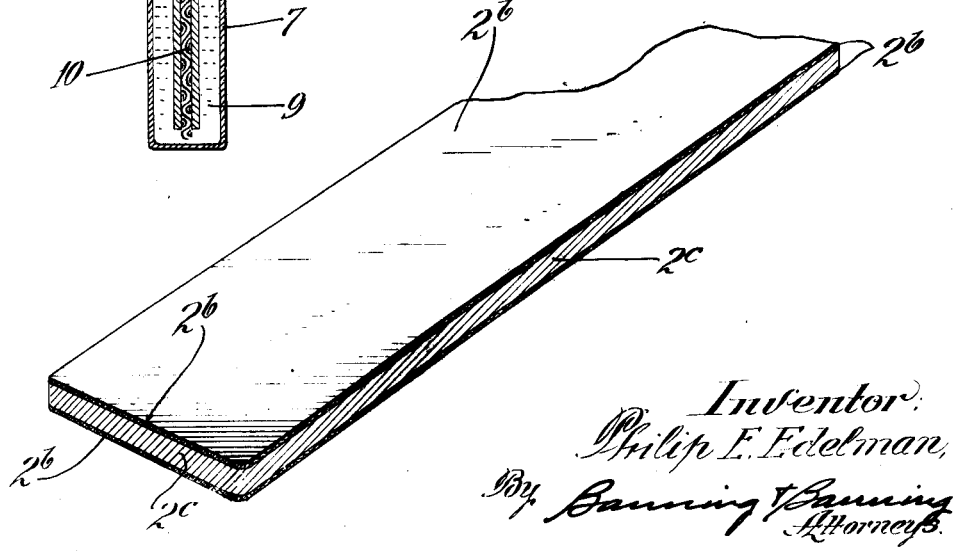
Inventor:
Philip E. Edelman
By Banning & Banning
Attorneys Patented Aug. 19, 1930

1,773,665

UNITED STATES PATENT OFFICE

PHILIP E. EDELMAN, OF CHICAGO, ILLINOIS, ASSIGNOR TO EPHRAIM BANNING, OF CHICAGO, ILLINOIS

POLARIZED ELECTRICAL COUPLE

Application filed April 12, 1928. Serial No. 269,615.

The present invention relates to electrochemical couples in which current conducting properties are polarized or oriented, and has for its objects (1) to increase the efficiency of such couples, (2) to facilitate the rapidity and uniform production of such couples, (3) provide new and useful improved electrolyte material therefor, having lower energy losses, (4) to provide improved structure for the contact electrode surface therefor, and (5) to provide very rapid action therein.

I am aware that my invention can be used practically in a variety of electrical circuits and for either rectifying, capacitative, peak voltage absorbing, lightning arrester, ionic relay, electrical filtering, or related purposes.

A couple of the class concerned usually consists of an electropositive metal electrode such as aluminum or magnesium immersed in or exposed to an electrolyte in liquid, paste, jelly or solidified crystal form, with a contacting electrode to conduct electricity to and from said electrolyte. Thus for a rectifier, an electrode of some other metal than aluminum can be used, while for a condenser it is permissible to use ordinary aluminum for said contacting electrode. For a condenser, an example of such a couple is comprised by an electrode of aluminum coated with a dielectric coating, an electrolyte, and a contacting electrode for the electrolyte. This invention is concerned with the aforesaid coating or dielectric material and said electrolyte.

In order to obtain improved working properties in such a couple it is necessary to secure a stable dielectric coating permanent on the active electrode surface which contacts with the electrolyte. Also, it is necessary to have an electrolyte material capable of maintaining or preserving said coating or renewing same, able to operate at temperatures above room temperature without corrosive action on said electrode, and capable of suppressing the so called "air line" effect. By "air line" effect is meant the tendency of corrosion to occur at the junction of the electrode between the atmosphere and the electrolyte.

Reference is made to the accompanying drawing in which an embodiment of the invention is illustrated in which—

Figure 1 shows a diagram of the circuit for the preparation of the filmed plates;

Fig. 2 is an operating assembly of plates prepared according to Fig. 1, shown diagrammatically in a sectional view; and Fig. 3 is an enlarged sectional view of a portion of a prepared plate made according to Fig. 1.

In Fig. 1, a source of high voltage direct current 6 is connected to a pair of treating cells 3 and 4. Switches 12 and $12_a$ permit individual control of current from the source 6. Cell 3 contains one preparing electrolyte hereafter designated as "A" preparing electrolyte. Cell 4 contains another preparing electrolyte hereinafter designated as "B" preparing electrolyte. A fixed electrode 1 of duriron, or other suitable material, is positioned in cell 3. A similar permanent electrode $1_a$ is placed in cell 4. A renewable detachable electrode 2 of material, such as aluminum, is placed in cell 3 and first treated therein, as hereinafter set forth. A renewable, detachable partially treated electrode $2_a$ which has already been treated in cell 3 is placed in cell 4 for treatment, as hereinafter set forth.

In Fig. 2, a prepared electrode plate $2_b$ prepared as herein set forth, is spaced from a co-operating electrode 11 by a fibrous spacer 10 impregnated with an operating electrolyte 9, as hereinafter set forth, so that an operative condenser is comprised at terminals 8 thereof. A wrapper or absorbent container of blotter paper 7 encloses the aforesaid elements $2_b$, 9, 10, 11.

In Fig. 3, a much enlarged partial section of a prepared plate $2_c$ is shown in order to illustrate the dielectric coating $2_b$ thereon, prepared according to the invention herein set forth, as illustrated in Fig. 1.

1. The dielectric coating is preferably applied to the sheet aluminum electrode material by first cleaning same with a dilute solution of nitric acid and sulfuric acid in water, using about ½ ounce of nitric and ¼ ounce of sulfuric acids per pound of distilled water, then washing said acid cleaned electrode material, and applying the coating as follows. The cleaned sheet aluminum is immersed in succession in two different electrolytes while connected to a source of direct current as a positive electrode. The first of said plurality of different electrolytes assists the other in securing the necessary firmly adhering dielectric coating, and the electrolytes are interchanegable in order of use. They do not however work as well when mixed together in a single solution for preparing the dielectric coating on said aluminum electrode material because vapor begins to rise from such a mixed solution under the influence of the applied electric current and heating occurs in such a mixed electrolyte rapidly. When the different electrolytes are used alternately or successively, good coatings of permanent nature result.

While any two different electrolytes may be successively used as aforestated, one thereof should preferably have a higher critical voltage than the other. By the expression "critical voltage" is meant the voltage at which internal sparking commences at the junction between the electrode and the electrolyte. I designate the two different preparing electrolytes or solutions as "A" and "B" respectively. "A" may be used before "B" or reversely, with equal results but the dielectric coating may be had quicker when "A" is used first and "B" thereafter. By the expression "quicker" I mean that permanent dielectric coats can be had in this manner in relatively short time of fifteen minutes instead of twenty four hours or more required in preparing similar coatings according to the prior art.

For the "A" preparing electrolyte I prefer to use a dilute solution of ammonium molybdate containing combined oxygen with most probably the formula, $(NH_4)_6Mo_7O_{24}$ united in crystal form with four molecules of water of crystallization, in about the proportion of ¼ ounce of said ammonium molybdate crystals dissolved in 14 lbs. of water. The solution in water should be clear and free from impurities.

For the "B" preparing electrolyte I prefer to use a dilute solution of ammonium bitartrate, having most probably the formula $NH_4HC_4H_4O_6$, in about the proportion of ¼ ounce thereof dissolved in 15 lbs. of distilled water.

Ordinary strips of sheet aluminum may be used as the negative contacting electrodes for each solution "A" and "B" and the liquid level may be maintained by additions of distilled water as required. The electrode pieces to be coated are connected as a positive electrode in the electrolyte.

Considering a particular electrode piece to be coated, say one of sheet aluminum .006 inch thick and 4 inches by 4 inches size with terminal tab or connector ½ inch by 2 inches formed therewith, same is inserted in electrolyte "A".

Electrolyte "A" may be contained in any suitable container and this is true for electrolyte "B" also. A source of direct current such as a generator provided with rheostat current control and driven by a variable speed motor to permit adjustable output voltages therefrom is connected with its positive terminal clipped to the tag connector strip of the electrode sheet just described which is to be coated, while the negative terminal from said supply source is connected to the contacting electrode used to conduct electricity to or from said electrolyte. Similar connections are used in the case of electrolyte "B". The current is first applied at a pressure of about 150 volts with relatively high current density of about 4 amperes for the particular sized piece just described and rapidly increased in pressure to 200 volts and further increased thereafter to the critical voltage at which sparks begin to show between the electrode being coated and the electrolyte "A". The current flow diminishes rapidly and luminescence can be seen on the electrode being coated. This luminescence increases in intensity and brightness up to the point at which internal sparking aforesaid begins. It is permissible to continue the treatment in electrolyte "A" by increasing the applied pressure up to 350 volts or more but the treatment should be terminated soon after general internal sparking all over the treated plate surface can be seen to occur.

The above treated electrode is now washed and placed in electrolyte "B". Pressure is applied thereto initially at about 350 volts and continued higher to 400 or 500 volts or more, terminating the treatment just before general internal sparking can occur. The electrode in electrolyte "B" will also luminesce in the dark but will not reach the critical voltage or general sparking stage as soon as it did in electrolyte "A". The same is true if the electrolyte "B" had been used first, before the electrolyte "A". There is no advantage in continuing the treatment for a prolonged time, as a good coat is had quickly by this method.

Another way to determine when each treatment is complete is to observe a pre-determined minimum current flow thru each electrolyte corresponding to the said completion. For the example described, a minimum current of 20 milliamperes may be arbitrarily predetermined. Any desired number of electrode pieces may be simultaneously treated in similar manner and no harm results if the temperature of the electrolytes reaches to just below the boiling point thereof.

It may be remarked that while no eating or corrosion of the aluminum metal so treated occurs, an air line will be visible during the treatment as a line of luminescence, particularly so in the "A" solution, and sometimes visible after treatment as a boundary mark most probably consisting of a deposit of molybdenum molybdate on the metal corresponding to the junction of the liquid and the atmosphere thereon. The coating so prepared will be of very fine texture and adherent to the metal as a smooth whitish coat, much as though same had been sprayed thereon as a paint. The negative contacting electrode in the "A" solution will become darkened, probably coated by a compound of, or metallic molybdenum deposited from the "A" solution. After prolonged use, a white precipitate will sometimes occur in the bottom of the container used for solution "A", but without detriment thereto. There is a marked absence of irregular coating or streaks or rough coated portions or flaked deposits or spots such as occur when previously known electrolytes are used, and total absence of eating or burning action on the metal.

The completed treated electrodes are washed and may be assembled for service as hereinafter described. It may be here remarked that the "A" solution has peculiar polarizing properties. It is capable of polarizing both ways if a source of alternating current is employed in place of the direct current used. Thus, if two ordinary pieces of aluminum are used as electrodes in the "A" solution, rapid polarization occurs on each and after a brief time no current will pass to an appreciable extent, from said alternating current source.

Thus, even if a black coated negative electrode first prepared in the "A" solution is used as an electrode in said "A" solution while a prepared coated electrode is used as the other electrode, or a plain piece of aluminum substituted for said last named electrode, and a source of alternating current is applied thereto, the couple acts briefly as a rectifier but shortly polarizes in both directions for the particular voltage employed. However if the applied voltage is raised, a further increment of current can flow. The couple so described can be used as a protective device for electrical circuits subject to sudden rise of voltage. This action differs from ordinary electrolyte couples wherein similar application of alternating current would merely break down the dielectric coating on one electrode and cause large current flow and heating. With such electrolyte "A" it is therefore possible to operate the couple on a source of alternating current without necessitating a direct current component as required by known electrolytes of the prior art. When nickel is used for one electrode in solution "A" with a prepared electrode, as aforesaid, the couple becomes uni-directional in its conducting ability and serves as a rectifier for a source of alternating current. For lightning arrester service, or for absorption of arcs occurring at switch contacts, any desired number of couples can be used in parallel or series connection. For condenser use, single couples are effective on voltages exceeding 300 volts if so desired. For lightning arrester service, a marked advantage of a couple as described, using "A" electrolyte is that energy loss is slight and need for maintenance charging is obviated.

2. *Theory of Coating.*—While the invention or discovery is of practical utility regardless of operating theory and the probable mode of operation is not a part of the invention, it may be remarked that the action appears to follow the Helmholtz doublet theory or so called double layer theory, the de Bye-Hückel theory, and theories of heteropolar compounds.

Reference is made to Eucken's book on Physical Chemistry published as a translation, 1925, by McGraw Hill Book Co., New York, N. Y., and to Hopkin's book on Experimental Electrochemistry, published 1905 by D. Van Nostrand Co., New York, N. Y., for the theoretical basis of the action. The coated electrodes so prepared do not appear to deteriorate with time even when left exposed to the atmosphere, and the dielectric coating appears to be permanently formed thereon, because immediately on insertion in an operating electrolyte, the prepared electrodes are at once operative without necessitating further reforming in the operating electrolyte. There is some uncertainty as to the exact nature of the coating and probably no entirely correct explanation of the physical nature thereof. Most probably it seems that a minute dielectric coating layer is formed on the treated electrode consisting largely or wholly of a molecular, as distinguished from an ionized, structure, it being known that a true molecular structure is a non-conductor. So it appears that the coating serves largely to insulate or prevent the metal aluminum from exerting its solution pressure on the operating electrolyte. Such coatings also, as a corollary, are useful as a protection for metallic aluminum, preventing corrosion thereof upon exposure to liquids or to the atmosphere. The orientation of the charged particles constituting the dielectric coating appear to be as permanent as in the case of magnetic molecules similarly oriented in a permanent magnet, and subject to change only under the influence of applied potential of sufficient intensity to serve as a depolarizer or reverse polarizer. The action in the case of electrolyte "A" with electrodes subjected to alternating current seems to be due to the peculiar rapid polarizing action of the molybdate on the electropositive metal, whereby the transient interchange of electrical charges during each half cycle of applied current cumulate to permanently polarize the structure at the contact surface for the particular voltage applied thereto. In studying this action I have experimented with additional agents to electrolyte "A" with following results.

When solution "A" is sufficiently dilute, small additions of borax and boric acid have no harmful effect, nor do small additions of gum arabic solution. Small additions of ammonium bitartrate to solution "A" cause the aforestated vaporizing effect when current is applied to the electrodes therein, even when the solution itself is at room temperature. In general, additional agents to solution "A" are of no known benefit. When the electrolyte "A" is thickened by boiling gum tragacanth therewith to form a thick paste, a peculiar blue colored material most probably consisting of molybdenum moylbdate starts forming at the positive electrode and disperses with time thru the gum tragacanth paste. This is probably moylbdenum molybdate and would be detrimental to the action desired as the leakage current through the couple is greatly increased thereby. However when gum tragacanth is used as an operating electrolyte alone or with adulteration of gum arabic, no such increase of leakage current thru the couple using the last named electrolyte material occurs.

3. *Operative assembly.*—When therefore, an operative couple is desired the electrolyte used for operation may be liquid or semisolid in form as desired. Blotter paper, gauze, or cellucotton can be used to absorb the operating electrolyte, or same can be combined with a gum or paste. Thus the aforesaid electrolyte "B" may be thickened with gum arabic syrup and used as an operating electrolyte if desired, or a mixture of gum arabic and gum tragacanth may be employed.

I have obtained satisfactory results also by using simply a syrup of gum arabic alone as the operating electrolyte for the couple used as a capacity element. The gum arabic, which is an organic acid of high molecular weight having marked optical rotary effect on a plane of polarized light transmitted thru a Nicol prism, as set forth in my copending application for Letters Patent of the United States, Serial No. 263,003, filed March 19, 1928, is suitable as the operating electrolyte for couples using the aforesaid prepared electrodes.

Thus the gum arabic syrup set forth can be employed, for example, by impregnating absorbent paper therewith or by applying same to the prepared electrodes aforesaid when said electrodes are covered with a spacer layer of gauze fabric. The gum arabic syrup also has the property of osmotic pressure to a high degree and capable of limiting the action of the solution pressure of the aluminum on the electrolyte. At any rate, practical observation shows that the gum arabic serves effectively for the purpose set forth and a re-inforcing agglomeration of particles therefrom can be observed close to the positive electrode of a couple such as I have described; but not adherent to the negative electrode of such a couple, other than by ordinary molecular adhesion due to the gummy property of the gum arabic. The agglomeration on the positive electrode can only be washed off from the positive electrode by considerable washing effort, whereas cold water easily removes the adhering particles from the negative electrode of the couple.

Continuing with the practical exemplifications set forth, three of the aforesaid prepared positive electrodes can now be assembled sandwiched with four ordinary pieces of aluminum of similar dimensions, spaced by layers of thin hospital gauze which gauze is pasted completely by means of a brush dipped in gum arabic syrup, prepared by dissolving gum arabic in water, mechanically much as in ordinary condenser construction; namely, alternate sheets of coated electrodes, impregnated gauze and plain metal electrodes, the latter comprising the negative terminal of the completed condenser. The assembly is then pressed together in a press and inserted in a protective container or envelope. The three positive electrode tab terminals are riveted together and to a suitable terminal wire or post, as are also the four negative metal sheets similarly finished.

Such a condenser, so formed, was measured and showed a capacity of 5 plus microfarads when operated on 210 volts rectified current, with leakage of less than 3 milliamperes. The couple can also be prepared in roll form as is obvious, or with absorbent paper replacing the aforesaid gauze spacer. It appears that condensers can be made from such couples to withstand operating voltages as high as 640 volts. The use of the "A" electrolyte alone is not recommended except on voltages less than 250 volts as an operating electrolyte, much better result being had by using the operating electrolyte aforesaid. It is permissible to use the "B" electrolyte as an operating electrolyte, singly, or thickened with gum arabic syrup, up to 400 volts pressure. Dimensions for a rectifier employing such a couple to rectify 150 milliamperes at 150 volts are two electrodes, one a strip of .008 aluminum, 1 inch by 6 inches prepared as aforestated and used with electrolyte "A", and one strip preferably being some metal other than aluminum, such as nickel or an alloy thereof. For a protective couple, two ordinary pieces of aluminum can be used with the "A" electrolyte, both prepared in the successive solutions "A" and "B" as aforesaid and capable of operation on either alternating or direct current service. Such a protective couple is simply connected as a shunt around the contacts or other circuit to be protected and will leak negligible current except on sudden increase of applied voltage surge thereon.

It may be remarked that the ammonium molybdate specified has a very high molecular weight, 1236.3, and large combined oxygen content; molybdenum itself when dissociated by the initial electrolysis having the property of holding much combined oxygen therewith. Observation shows that a number of chemical reactions largely reversible in nature with recombinations, probably occur in the electrolyte "A" during use thereof. The same treated electrode which sparks in electrolyte "A", when subsequently treated as aforesaid in electrolyte "B" and then replaced in electrolyte "A", after washing thereof free from traces of solution "B", does not spark as set forth in electrolyte "A". The effect of the plural preparation of the electrode in both solutions "A" and "B" seems to be to set the oriented particles comprising the dielectric coating and prevent the aforesaid internal surface sparking notice when the electrode is treated only in electrolyte "A" and not set by treatment in electrolyte "B". The couple is stable and does not appear to deteriorate with use. Anyone skilled in the art will proportion the dimensions for each particular application in customary manner with sufficient thermal mass to care for the heating effect of the electrical current passed via the couple.

In this specification I have in each case named one preferred exemplification of a well established class of chemical compounds and the reaction involved is one of the characteristics of that class of compounds. In the stated class with ammonium hepta-molybdate, suitable related members of that class are ammonium molybdate, molybdic acid, sodium molybdate, tri-sodium molybdate, tetra-sodium molybdate, deka-sodium molybdate, ammonium phosphomolybdate, and potassium molybdate capable of forming a molybdate colored deposit on a filming metal. In the stated class with ammonium bi-tartrate are included, potassium acid tartrate, and tartaric acid capable of an acidic reaction of tartaric acid upon electrolysis in the treatment of the filming metal. Such chemicals fall clearly in the respective classes where the reaction involved is characteristic for such class and readily recognizable by those skilled in chemistry.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A polarized electrical couple comprising a metallic electrode coated with an electrochemical decomposition product prepared from ammonium molybdate, and an operative electrolyte therefor.

2. A polarized couple comprising metallic electrodes one of which is composed of a filming metal and an electrolyte containing ammonium molybdate.

3. A polarized couple comprising electrodes, one of which is composed of a filming metal and an electrolyte of the molybdate class capable of affording a colored deposit on said filming metal containing a molybdate having oxygen combined therewith.

4. A polarized electrical couple comprising electrodes and an electrolyte therefor, characterized by the fact that at least one of said electrodes has a prepared film coating thereon and characterized further by the fact a portion of said coating consists of a very thin layer of molybdenum molybdate.

5. A polarized electrical couple comprising an electrode, a filmed electrode, and an electrolyte therefor, characterized by the fact that said filmed electrode comprises a filmed coating derived from a molybdate and bearing a distinctive molybdate coloring.

6. A polarized electrical couple comprising metallic electrodes, one of which is prepared with a dielectric coating prepared in a solution of a compound of a molybdate of the empirical class, namely, ammonia, sodium and potassium, and an operative electrolyte therefor.

7. A polarized electrical couple comprising metallic electrodes, one of which is prepared with a dielectric coating prepared from an electrochemical decomposition product of an electrolyte of a solution of a compound of a molybdate of the empirical class, namely, ammonia, sodium and potassium, and a cooperating electrolyte therefor.

8. A polarized electrical couple comprising metallic electrodes and an operating electrolyte therefor, one of said electrodes having combined thereon a dielectric coating prepared in a solution of a compound of a molybdate of the alkaline metal group and a solution of a compound of the bitartrate class.

9. A polarized electrical couple for the purpose set forth comprising an aluminum electrode prepared with a dielectric coating in a solution of a compound of a molybdate of the empirical class, namely, ammonia, sodium and potassium and a solution of a compound of the bitartrate class characterized by a distinctive coloring imparted to said coating by the characteristics of said solution of a compound of the molybdate class, a cooperating electrode for said aluminum electrode, and an operating electrolyte for said electrodes.

10. A polarized electrical couple of the class set forth comprising electrodes, one of which is coated with a dielectric material prepared in a polarizing electrolyte of a compound of a molybdate of the empirical class, namely, ammonia, sodium and potassium and stabilized by further treatment in a solution containing a bitartrate, and an operating electrolyte for said electrodes containing an organic acid of high molecular weight.

11. A polarized electrical couple of the kind specified comprising electrodes and an operating electrolyte therefor, one of said electrodes having a dielectric coating prepared thereon by electrochemical treatment in a solution of a compound of molybdate of the empirical class, namely, ammonia, sodium and potassium and a solution of a compound of the bitartrate class, and an organic gum included in said operating electrolyte to preserve said dielectric coating.

12. A polarized electrical couple comprising a plurality of electrodes, one of which is filmed, and an operating electrolyte therefor characterized by the fact that said electrode which is filmed is so filmed by pretreatment with a solution of a compound of a molybdate of the empirical class, namely, ammonia, sodium and potassium and a solution of a compound of a bitartrate class whereby said film is formed by the joint action of the treating electrolytes on said filmed electrode.

13. A polarized electrical couple comprising metallic electrodes and an operating electrolyte therefor, one of said electrodes having combined thereon a dielectric coating prepared in a compound of a molybdate of the empirical class, namely, ammonia, sodium and potassium characterized by a coloring of said coating imparted to a portion thereof by the characteristics of said molybdate class solution and a solution of a compound of a bitartrate.

14. A polarized electrical couple for the purpose set forth comprising an aluminum electrode prepared with a dielectric coating in a solution of a compound of a molybdate of the empirical class, namely, ammonia, sodium and potassium capable of imparting a distinctive molybdate coloring to a portion of said coating and a solution of a compound of a bitartrate class capable of stabilizing said coating.

15. A polarized electrical couple of the character described comprising electrodes and an operative electrolyte therefor, one of said electrodes having a dielectric coating prepared thereon by electrochemical treatment in a plurality of polarizing solutions of different critical voltages, one of which contains a soluble molybdate of the alkaline group, the other containing a compound of the tartrate class.

16. A polarized electrical couple comprising metallic electrodes, one of which is prepared with a dielectric coating prepared successively in two separate electrolytes of different critical voltage characteristics, one of which electrolytes contains a molybdate of the empirical class of the alkaline group and the other of which contains a tartrate.

17. A polarized electrical couple comprising a plurality of electrodes, one of which is filmed, and an operative electrolyte therefor, characterized by the fact that said filmed electrode is filmed by pretreatment successively with separate electrolytes containing, respectively, a molybdate of the empirical class, namely, ammonia, sodium and potassium, and a soluble bitartrate.

18. A polarized electrical couple comprising, in operative combination, first, an operative electrolyte, secondly, an electrode contacting with said electrolyte, and thirdly, a cooperating filming metal electrode, said last-named electrode being coated with a plurality of film particle layers, one of said layers being applied thereto at a higher critical voltage than the other, said first-named layer being derived from a solution containing a molybdate and said second-named layer being derived from a solution containing a tartrate.

In witness whereof I have hereunder set my hand this 10th day of April, 1928.

PHILIP E. EDELMAN.